United States Patent
Vera et al.

(10) Patent No.: US 7,294,000 B2
(45) Date of Patent: Nov. 13, 2007

(54) ADAPTABLE JUNCTION BOX APPLICABLE TO AUTOMOTIVE VEHICLES

(75) Inventors: Marc Homs Vera, Valls (ES); Hugo Prado Aguar, Valls (ES); Teresa Balado Margeli, Valls (ES)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/361,408

(22) Filed: Feb. 24, 2006

(65) Prior Publication Data

US 2007/0202717 A1    Aug. 30, 2007

(51) Int. Cl.
    *H01R 12/00*    (2006.01)
(52) U.S. Cl. .................... 439/76.2; 307/10.1
(58) Field of Classification Search ............... 439/34, 439/76.2; 307/10.1; 361/637, 639
    See application file for complete search history.

(56) References Cited

U.S. PATENT DOCUMENTS 4,255,004 A * 3/1981 Kourimsky et al. .......... 439/65
4,355,853 A * 10/1982 Kourimsky .................. 439/65
6,280,253 B1   8/2001 Kraus et al.
6,693,370 B2   2/2004 Yamane et al.

FOREIGN PATENT DOCUMENTS

JP    2002051439    2/2002

* cited by examiner

*Primary Examiner*—Khiem Nguyen
(74) *Attorney, Agent, or Firm*—Brooks Kushman P.C.

(57) ABSTRACT

A junction box includes inputs and outputs, and electronic elements for distributing electric power, received at an input from a power source of a vehicle, to the outputs to provide power to loads of the vehicle which are connected to the outputs. The electronic elements include semiconductor switches operable for distributing the power to the loads via the outputs. A first controller controls operating conditions of the switches and adjusts operative cycles of the switches to the number and type of loads. The first controller is programmable according to features of the vehicle in terms of the amount and type of loads. A monitor may monitor the loads and be associated with a processor and a second controller for controlling the operating conditions of the switches to dynamically and automatically adjust the operative switch cycles to the demands of the loads according to a shaping thereof performed by the processor.

20 Claims, 3 Drawing Sheets

ADAPTABLE JUNCTION BOX APPLICABLE TO AUTOMOTIVE VEHICLES

BACKGROUND OF THE INVENTION

1. Field of the Invention

The present invention generally relates to a junction box applicable to automotive vehicles, and more particularly to a junction box for distributing electrical power to loads of an automotive vehicle through semiconductor switching devices in a manner which is controllable and adaptable to the loads.

2. Background Art

Junction boxes are used in automotive vehicles to electrically connect different electrical devices, components, and circuits in order to carry out a suitable distribution of electrical power through fuses and switching devices such as relays. A limitation that junction boxes had, and which some still have, was that they were designed for specific applications existing in the vehicle in which they were to be assembled. As such, they lacked flexibility and could only be used for the vehicle in which they were to be assembled.

U.S. Pat. No. 6,280,253 attempts to solve such limitation by proposing a junction box that can be used for a wide variety of vehicles. To that end, the '253 patent proposes a matrix of terminals mechanically configurable in a selective manner in order to adapt the box to the desired vehicle by means of the union or separation of the terminals. The adaptability achieved by means of the proposal involves the use of elements external to the box, as well as the need for an operator or machine to mechanically configure the desired electrical scheme from the matrix of terminals in the assembly process. The '253 patent simply refers to connecting or disconnecting terminals but not to the use of another type of electrical or electronic components.

With the advancement of semiconductor technology, the next developmental step applied to junction boxes was the replacement of traditional electromechanical relays with semiconductor devices. Such advancement is reflected in U.S. Pat. No. 6,693,370, which relates to a junction box replacing the electromechanical relays with semiconductor devices (such as FET, IGBT, and GTO transistors, etc.). The '370 patent proposes the use of a control board to control the switching of the semiconductor devices.

Although the '370 patent uses the advancement in semiconductor technology, such use is in a very early phase because fuses, which must be accessible for their replacement, are still used in the proposed box. Further, the '370 patent only refers to a fairly basic control of the transistors (which are only power transistors), centered only in the actuation or deactuation thereof. The '370 patent does not refer to the adaptability of the proposed box to different types of vehicles.

JP 2002-051439 A brings together the advantages of the '253 and '370 patents, i.e., adaptability of the junction boxes to different vehicles and the replacement of traditional electromechanical relays with semiconductor devices. JP '051439 achieves the adaptability for different vehicles and specifications, not mechanically as in the background discussed above, but by selectively connecting or disconnecting the semiconductor devices included in the box. To that end, JP '051439 proposes the inclusion of a control table for the semiconductor devices, arranged in a control unit (ECU) and which can be varied and configured in advance so as to adapt it to the specific vehicle where the junction box will be assembled.

The table only refers to the activation or deactivation of the semiconductor devices according to the vehicle in which it will be assembled, i.e., the number of loads it will support. JP '051439 does not propose a more elaborate control thereof, nor does it take into account more information referring to the loads other than the number of the loads. JP '051439 does not contemplate the possibility of modifying the control table once the box is installed in an automotive vehicle, which is programmed in advance during the manufacturing process thereof.

SUMMARY OF THE INVENTION

It is desirable to offer an alternative to the state of the art in the form of a more evolved junction box than those proposed by the discussed background documents. The present invention provides such an evolved junction box. The junction box in accordance with the present invention benefits from the advantages offering the advancement of semiconductor technology in terms of control thereof so that, in addition to replacing the traditional electrical and electromechanical components, the junction box can be adapted to different vehicles with different functions and components by means of a programming of the junction box. The programming can be carried out not necessarily in advance, as in JP '051439, but once the junction box is assembled in a certain vehicle. The junction box is adaptable to the loads to be fed by means of the programming such that the loads can be taken into account not only in terms of their numbers but also considering another series of parameters related thereto.

Accordingly, the present invention relates to an adaptable junction box applicable to automotive vehicles. The adaptable junction box is termed herein as a Universal Programmable Power Distributor ("UPPD"). The adaptable junction box has the form of an electric programmable module for power distribution. The adaptable junction box includes a series of electrical and electronic elements for distributing electrical power coming from one or more power sources of an automotive vehicle (such as one or more batteries) to be connected to an input(s) of the box, electrically connected to the junction electrical wiring, toward a series of devices or loads of the vehicle, to be connected to outputs of the box, also electrically connected to the junction electrical wiring. The electrical and electronic elements include several semiconductor switching devices suitable for distributing the electrical power or to feed at least a part of one or more of the loads.

The adaptable junction box includes first control means for controlling the operating conditions of the semiconductor switching devices. The first control means are also for adjusting the operative cycle of the semiconductor switching devices to the number and type of loads to be connected to the outputs. The first control means are programmable according to the features of the vehicle where the box is or will be installed, in terms of the number and type of loads.

The adaptable junction box may further include means for monitoring the loads connected to the outputs, associated to processing means and to second control means for controlling the operating conditions of the semiconductor switching devices to dynamically and automatically adjust the operative cycle of the switching devices to the load demands, according to a shaping thereof carried out by the processing means.

The semiconductor switching devices not only replace traditional electromechanical relays but also replace fuses. This makes it possible for the adaptable junction box to be more compact and have smaller dimensions than traditional junction boxes. The adaptable junction box, which is relatively more compact, is not affected by the restrictions thereof in terms of its location in a vehicle because (a) it is not necessary for the junction box to be accessible to a user as the components forming the junction box need not be changed (as occurred with fuses and relays in conventional junction boxes), and (b) the programming of the junction box can be carried out through communications networks already existing in the vehicle (such as CAN or LIN networks, i.e., the existence of a communications interface accessible for the user is sufficient, which is the case for vehicles having such telecommunications networks).

The same adaptable junction box in accordance with the present invention can be used for different versions of the same class of vehicles from low-level classes incorporating a relatively low number of functions to high-level classes with a large number of electrical devices to be fed. In the latter case, two or more of the adaptable junction boxes can be used and connected in parallel, for example, through the communication networks already existing and discussed above.

The advantages of using semiconductor switching devices instead of fuses and electromechanical relays are considerable, such as, for example, and in addition to the mentioned control thereof, greater protection against short-circuits (faster), resetting and readjustment of the boxes, etc. All in all, greater security is achieved in the operations to be carried out.

The junction box manufacturing process is simplified by means of the adaptable junction box because each adaptable junction box is manufactured with the same hardware configuration (or with very slight variations) and then subsequently adapted by means of software to the vehicle where it is assembled. It is possible to carry out this last step when programming the remaining software in the vehicle, whereupon an additional specific step for customizing an adaptable junction box to the vehicle would not be required.

The simplification in the manufacturing process results in a reduction in manufacturing costs, especially for high production volume.

DETAILED DESCRIPTION OF THE PREFERRED EMBODIMENT(S)

Figure 1:
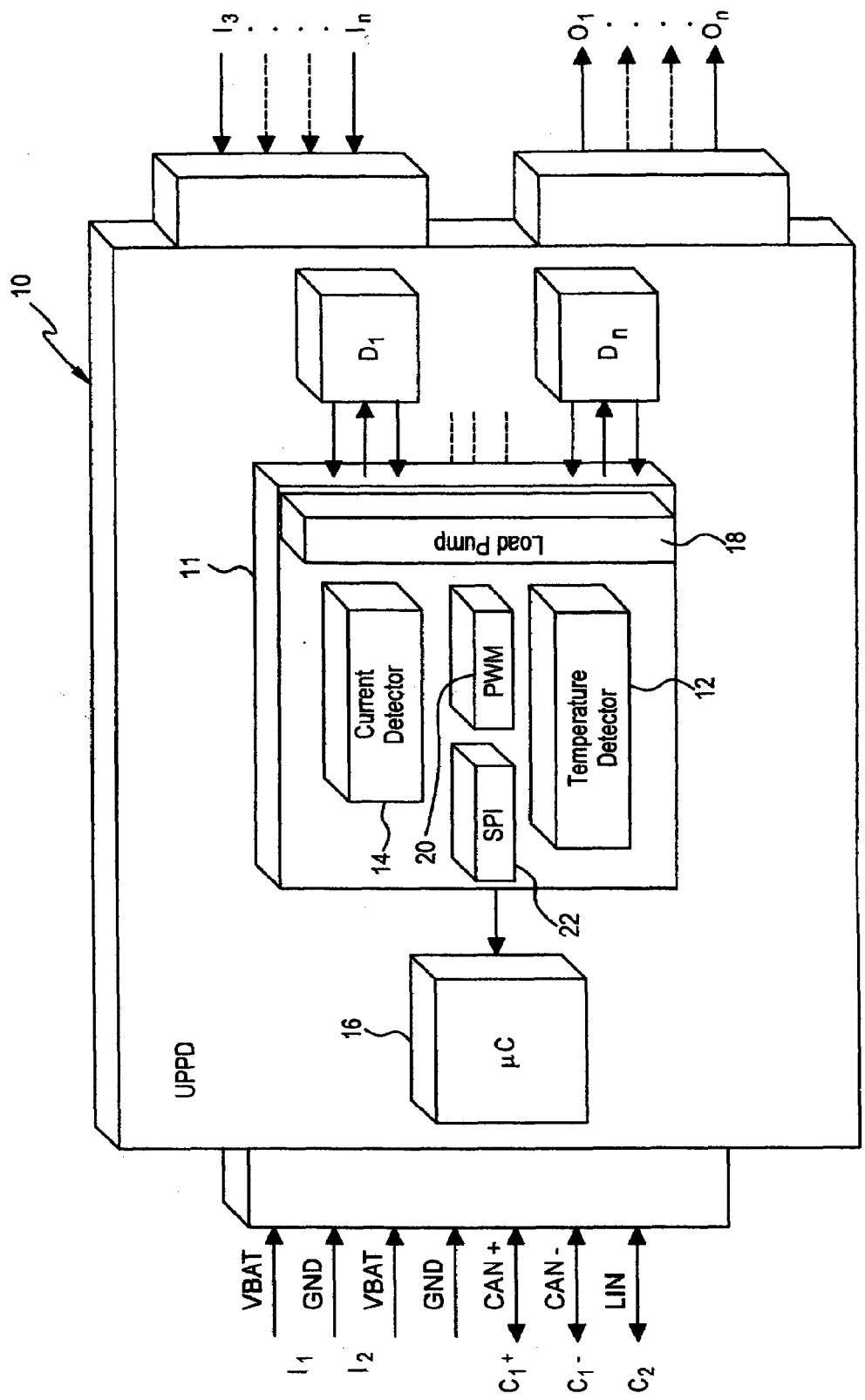
FIG. 1 illustrates a block diagram representing a first embodiment of an adaptable junction box in accordance with the present invention.

Referring now to FIG. 1, an adaptable junction box (UPPD) 10 applicable to automotive vehicles in accordance with a first embodiment of the present invention is shown. Junction box 10 includes a series of inputs I1 . . . In and a series of outputs O1 . . . On. Junction box 10 further includes a series of electrical and electronic elements D1 . . . Dn to at least distribute electrical power, inputted to the junction box, towards a series of devices of loads L1 . . . Ln (shown in FIGS. 3 and 4) of an automotive vehicle in which the junction box is to be installed. The inputted electrical power comes from one or more power sources such as batteries of the vehicle in which junction box 10 is to be installed. The batteries are to be connected to one or more of the inputs. For example, as shown in FIG. 1, inputs I1, I2 are both connected to the positive terminal VBAT and the ground terminal GND of a battery. The series of devices or loads L1 . . . Ln of the vehicle are to be connected to outputs O1 . . . On of junction box 10. Electrical and electronic elements D1 . . . Dn include several semiconductor switching devices suitable for distributing the electrical power to or feeding loads L1 . . . Ln.

There are different types of semiconductor switching devices D1 . . . Dn in junction box 10, among which there are semiconductor power devices, such as field effect transistors FETs, acting in turn as switching elements or relays and as protection elements or fuses. The use of another type of semiconductor switching devices is also possible.

Junction box 10 includes first control means for controlling the operating conditions of semiconductor switching devices D1 . . . Dn to adjust their operative cycle to the number and type of loads L1 . . . Ln to be connected to outputs O1 . . . On. The first control means are programmable according to the features of the vehicle in which junction box 10 is or will be assembled, in terms of the number and type of loads L1 . . . Ln.

Junction box 10 further includes monitoring means for monitoring loads L1 . . . Ln connected to outputs O1 . . . On. The monitoring means are associated with processing means and second control means for controlling the operating conditions of semiconductor switching devices D1 . . . Dn, to dynamically and automatically adjust the operative cycle of switching devices D1 . . . Dn to the demands of loads L1 . . . Ln according to a shaping thereof carried out by the processing means.

The simplest embodiment example of the operative cycle of semiconductor switching devices D1 . . . Dn includes the selective activation/deactivation thereof. Other more elaborate examples related to the adjustments of the operative cycles of semiconductor switching devices D1 . . . Dn will be explained below, some of them in reference to FIGS. 3 and 4.

Junction box 10 includes temperature detection means associated with the second control means in order to adjust the operative cycle of semiconductor switching devices D1 . . . Dn according to the temperature thereof, thus providing thermal protection to semiconductor devices D1 . . . Dn, either because a poor operation of the load it supports causes a thermal increase, in which case the temperature detection means could be considered part of the monitoring means for monitoring loads L1 . . . Ln, or due to other causes not related to the operation of loads L1 . . . Ln.

Junction box 10 includes a temperature detector 12 which forms part of the temperature detection means. Junction box 10 further includes a current detector 14. Current detector 14 detects the intensity of electrical current circulating through semiconductor switching devices D1 . . . Dn. Current detector 14 generally forms part of the monitoring means for monitoring loads L1 . . . Ln, because the circulating intensity will likewise circulate through loads L1 . . . Ln, and a variation of intensity is normally indicative of the consumption occurring in loads L1 . . . Ln. Nevertheless the variation of the intensity circulating through semiconductor switching devices D1 . . . Dn may also occur due to a poor operation thereof, in which case temperature detector 14 would be part of detection means for detecting the state of semiconductor switching devices D1 . . . Dn, which the temperature detection means could also be considered to belong to when the variation of the temperature is not due to loads L1 . . . Ln. The detection means for detecting the state of semiconductor devices D1 . . . Dn are also associated with the second control means to dynamically and automatically adjust the operative cycle of switching devices D1 . . . Dn according to the state thereof.

As shown in FIG. 1, junction box 10 includes an electronic system having a micro-controller ("µC") 16. Micro-controller 16 integrates at least part of the first and second control means, the processing means, one or more memories internal and/or external to the micro-controller, and a series of communication interfaces C1+, C1−, and C2. Communication interfaces C1+, C1−, and C2 are preferably two-way interfaces suitable for being connected to one or more communications networks of an automotive vehicle which, for the embodiment example of FIG. 1, include a control area network ("CAN") and a local interconnect network ("LIN").

As shown in FIG. 1, junction box 10 includes at a modular level 11 a series of modules. The modules include temperature and current detector modules having temperature and current detectors 12, 14 for the activation of semiconductor devices D1 . . . Dn, a load pump module 18, and a pulse width modulation ("PWM") converter module 20. In association with such devices, junction box 10 also includes a serial peripheral interface ("SPI") module 22 for the communication of modules 12, 14, 18, and 20 with micro-controller 16.

The memory of the electronic system has recorded values relating to the programming of the first control means. The values are introduced through communications interface C1+, C1−, and C2, for example, when introducing the rest of the software of the vehicle at the end of the assembly line, to adjust junction box 10 to a specific vehicle.

Nevertheless, the electronic system is also suitable for replacing the values with new values, also introduced through communications interface C+, C1−, and C2, to adjust the operative cycle of semiconductor switching devices D1 . . . Dn to new features, in terms of the number and type of loads, of the same or another vehicle, either because the vehicle demands have changed (because electrical devices or loads have been added for example), or because junction box 10 of one vehicle is to be re-used in another vehicle with different demands or functions.

For another embodiment example not shown, one of communications interfaces C1+, C1−, and C2 is suitable for the connection of external equipment, such as a manual programmer, to carry out the programming from the external equipment.

Inputs I3 . . . In indicated in FIG. 1 which are not connected to a battery of the vehicle may be of a very different nature and have different functions. For example, such inputs may connect with other additional power sources or may be used to redistribute electric power coming from another junction box to corresponding outputs O1 . . . On. Further, such inputs may be configured to receive readings from sensors associated with loads L1 . . . Ln.

For a preferred embodiment example, semiconductor switching devices D1 . . . Dn integrate some of the second control means, either in part or entirely. This is possible by means of the use of next-generation semiconductor devices as semiconductor switching devices D1 . . . Dn.

Figure 2:
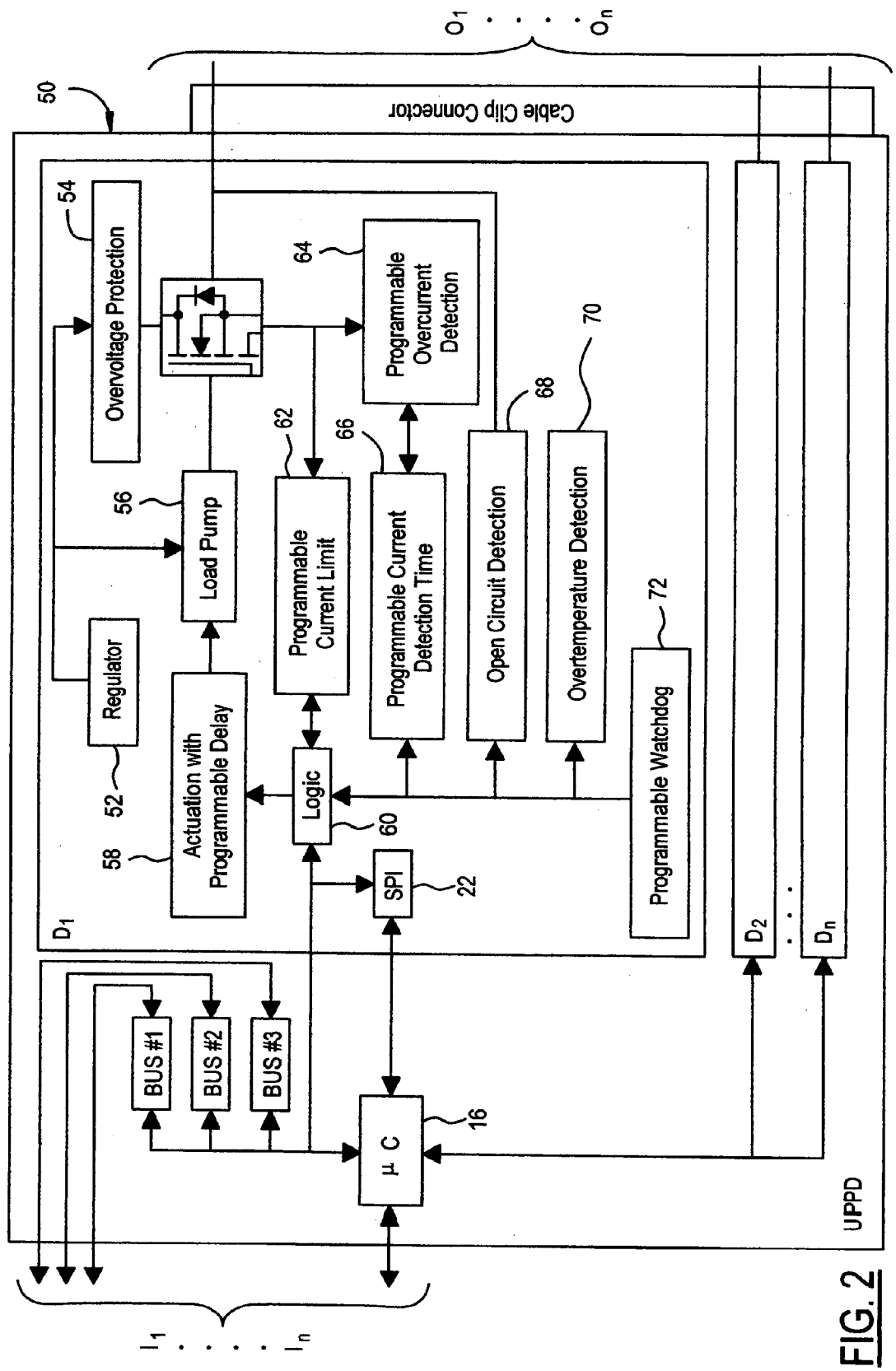
FIG. 2 illustrates a block diagram representing a second embodiment of the adaptable junction box in accordance with the present invention.

Referring now to FIG. 2, with continual reference to FIG. 1, an adaptable junction box 50 in accordance with another embodiment of the present invention is shown. Junction box 50 includes many of the same elements as junction box 10 and like elements have the same reference numbers. Junction box 50 generally differs from junction box 10 by incorporating next-generation semiconductor switching devices D1 . . . Dn.

In FIG. 2, next-generation semiconductor switching device D1 is shown in detail. As shown, next-generation semiconductor switching device D1 includes a series of modules having different functions. Likewise, the other next-generation semiconductor switching devices D2 . . . Dn include such modules. Accordingly, the modules will be discussed hereinafter in relation to next-generation semiconductor switching device D1. The functions provided by the modules include the monitoring, protection, and triggering of the transistor included in next-generation semiconductor switching device D1. Some of the modules are part of the second control means and other modules (for example, those responsible for monitoring functions) are associated thereto.

The modules associated with next-generation semiconductor switching device D1 of junction box 50 include: a regulating module ("regulator") 52; an over-voltage protection module 54; a load pump module 56; an actuation with programmable delay module 58; a logic module 60; a programmable current limit module 62; a programmable over-current detection module 64; a programmable current detection time module 66; an open circuit detection module 68; an over-temperature detection module 70; a programmable watchdog module (security timer) 72; and a serial peripheral interface ("SPI") module 22. SPI module 22 enables communications between the other modules and micro-controller 16, which is external to next-generation semiconductor switching device D1. Junction box 50 further includes a series of buses BUS #1 . . . BUS #n for enabling communications between inputs I1 . . . In, micro-controller 16, and next-generation semiconductor switching devices D1 . . . Dn.

Outputs O1 . . . On of junction box 50 are accessible through a cable clip-type connector. However, another type of connector is possible and another type and number of modules to integrated in the next-generation semiconductor devices D1 . . . Dn is possible, according to the application junction box 50 will be given and the technological development of such devices.

The aforementioned adjustment of the operative cycle of semiconductor switching devices D1 . . . Dn includes multiple and different ways of acting to achieve such adjustment, such as those consisting of actuating several semiconductor devices D1 . . . Dn in order to feed in parallel the same load L1 . . . Ln. Other more complex actions, the purpose of which is to adjust the operative cycle of semiconductor switching devices D1 . . . Dn, include, when load L1 . . . Ln is an electric motor, limiting as well as gradually increasing the current to be circulated through one or more semiconductor switching devices D1 . . . Dn to feed the motor such that a smooth start-up thereof is obtained.

Figure 3:
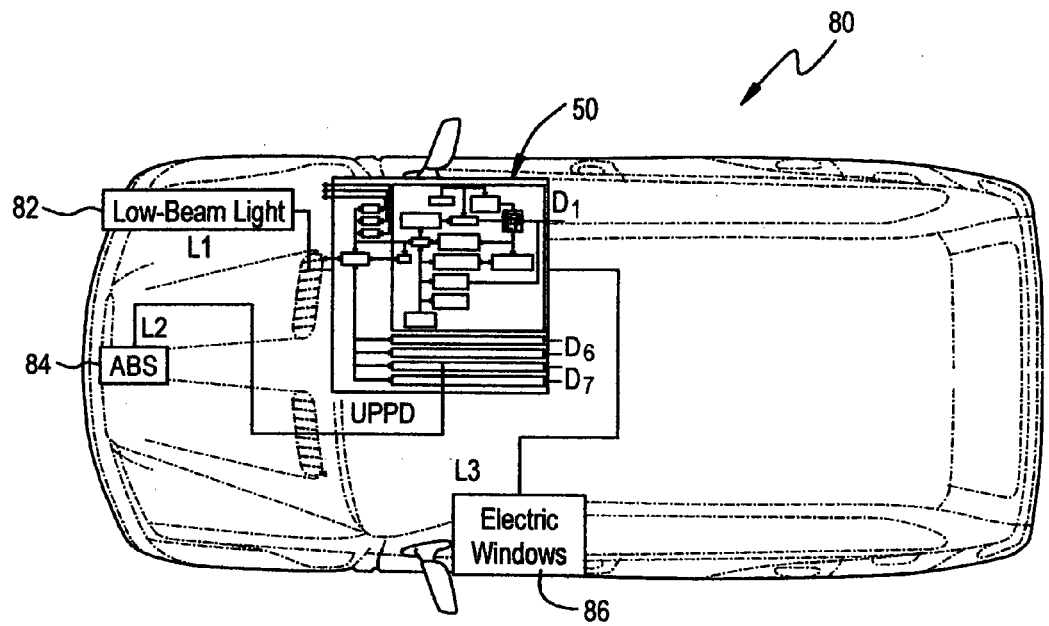
FIG. 3 illustrates a schematic plan view of an automotive vehicle having installed therein an adaptable junction box in accordance with the present invention for an embodiment example.
Figure 4:
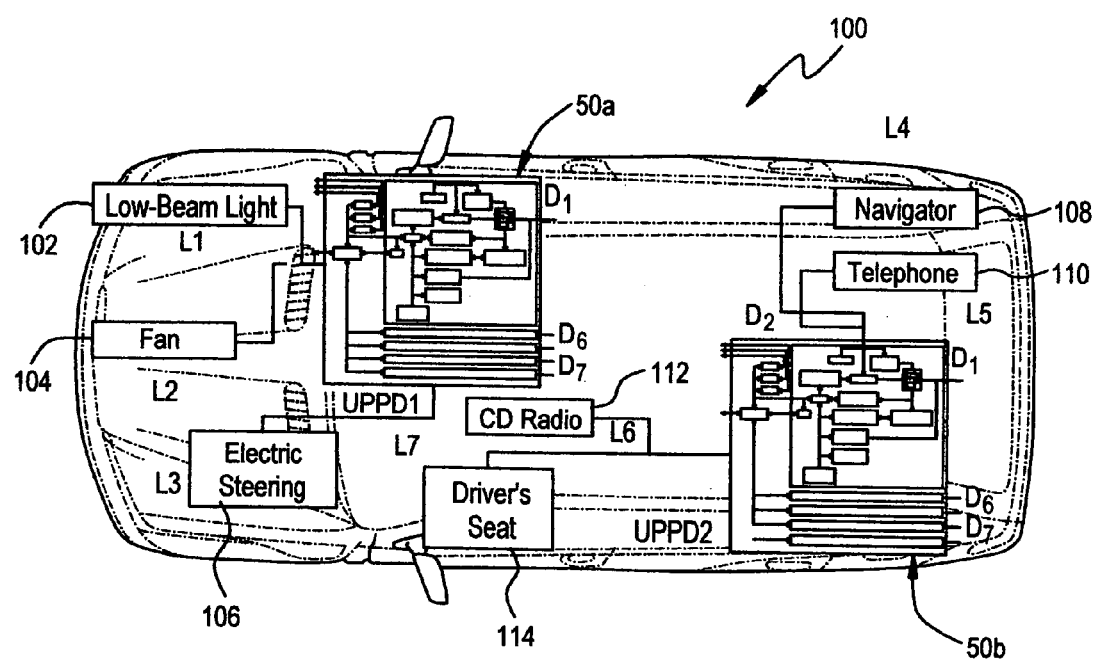
FIG. 4 illustrates a schematic plan view of an automotive vehicle having installed therein two adaptable junction boxes in accordance with the present invention for another embodiment example.

FIGS. 3 and 4 illustrate two embodiment examples for two respective vehicles with different functionality levels. FIG. 3 illustrates a vehicle 80 of a lower-level class having a single adaptable junction box such as junction box 50. FIG. 4 illustrates a vehicle 100 of a higher-level class having two adaptable junction boxes such as two junction boxes 50a, 50b.

In reference to FIG. 3, for the embodiment example shown therein, vehicle 80 has connected to junction box 50 three loads L1, L2, and L3. Loads L1, L2, and L3, respectively, specifically refer to a low-beam light 82, an ABS braking system 84, and electric windows 86 as indicated in FIG. 3.

Load L1, representing low-beam light 82, does not entail a large current consumption. As such, load L1 can be fed with a single semiconductor device such as, for example, D1. In this case, D1 performs a simple protection and switching function. Load L2, representing ABS braking system 84, does require a large current consumption. The large current consumption required by L2, generally on the order of about 40A, is difficult to satisfy with a single semiconductor device. As such, two parallel-connected semiconductor devices such as D2 and D3 are used for load L2 for the present embodiment example.

For load L3, representing electric windows 86, four semiconductor devices D4, D5, D6, and D7 have been arranged in bridge configuration in order to be able to move the window motors in both rotation directions, and a smooth start-up has been programmed (preventing start-up peaks) as well by means of a corresponding limitation of the current to be circulated through semiconductor switching devices D4, D5, D6, and D7.

Both the connection of a single semiconductor switching device and the parallel connection of two semiconductor switching devices, and the bridge connection of four of semiconductor switching devices (other configurations entailing reversibility), as well as the limitation of the current to be circulated through semiconductor switching devices, are different examples relating to the adjustments of the operative cycles of semiconductor switching devices D1 . . . Dn.

Automotive vehicle 100 shown in FIG. 4 has a functionality level such that it requires having two adaptable junction boxes ("UPPD1" and "UPPD2") in accordance with the present invention such as junction boxes 50a, 50b.

For the embodiment example shown in FIG. 4, automotive vehicle 100 has three loads L1, L2, and L3 connected to a first junction box UPPD1 50a. Loads L1, L2, and L3, respectively, refer to a low-beam light 102, a fan 104, and an electric steering system 106. Load L1 represents a low-beam light 102 and, as for the previous embodiment example of FIG. 3, can be fed with a single semiconductor device, for example D1, which performs a simple protection and switching function. For load L2, which represents fan 104, due to the consumption peaks that such type of device usually causes, two parallel-connected semiconductor devices such as D1 and D2 of first junction box 50a have been arranged. With respect to load L3, which refers to electric steering system 106, although the consumption demands of system do not entail the need to use more than one semiconductor device, due to the importance of such system and for the purpose of complying with an increased safety function, two semiconductor switching devices, such as D3 and D4 of junction box 50a are arranged operating in redundant mode.

For the embodiment example illustrated in FIG. 4, automotive vehicle 100 has four loads L4, L5, L6, and L7 connected to a second junction box 50b. Loads L4, L5, L6, and L7 respectively refer to a navigation system 108, a telephone 110, a CD radio 112, an electric seat 114 such as the driver's seat. Each of loads L4, L5, and L6 is, for example, able to be fed by means of a single semiconductor device. Load L7 is able to be fed by means of two parallel-connected semiconductor devices.

Obviously needing more or less semiconductor devices to feed a load depends on the features thereof, especially on the maximum direct current that they are able to support, which also depends on the design (mechanical, thermal, etc.) of the junction box.

An adaptable junction box in accordance with the present invention such as junction boxes 10 and 50 may include a casing which houses all of the electrical and electronic elements inside the junction box. The casing may have openings for the purpose of gaining access to inputs I1 . . . In, outputs O1 . . . On, and communications interfaces C1+, C1−, C2, thus adopting a compact and robust shape to a junction box.

Regarding the shaping of the operation of loads L1 . . . Ln, this may include from obtaining a prior mathematical model thereof for an initial programming of an adaptable junction box, based on simulations for example, to a more real shaping which adapts, preferably in real-time, to the constant variations thereof throughout their useful life, to which end any algorithm designed for such purposes and which a person skilled in the art considers appropriate can be used.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention. A person skilled in the art could introduce changes and modifications in the embodiment examples described without departing from the scope of the present invention as it is defined in the following claims.

What is claimed is:

1. An adaptable junction box for automotive vehicles, the junction box comprising:

one or more inputs;

a plurality of outputs;

electronic elements for distributing electric power, received at one of the inputs from a power source of a vehicle, to the outputs in order to provide electrical power to loads of the vehicle which are connected to the outputs;

wherein the electronic elements include a plurality of semiconductor switching devices operable for distributing the electrical power to the outputs in order to provide electrical power to the loads which are connected to the outputs; and first control means for controlling operating conditions of the semiconductor switching devices and for adjusting operative cycles of the semiconductor switching devices to the number and type of loads connected to the outputs;

the first control means being programmable according to features of the vehicle in terms of the amount and type of loads.

2. The junction box of claim 1 further comprising:

monitoring means for monitoring the loads which are connected to the outputs, the monitoring means being associated with processing means and second control means for controlling the operating conditions of the semiconductor switching devices to dynamically and automatically adjust the operative cycles of the semiconductor switching devices to the demands of the loads according to a shaping thereof carried out by the processing means.

3. The junction box of claim 1 wherein:

the semiconductor switching devices function as fuses.

4. The junction box of claim 1 wherein:

the adjustment of the operative cycle of a semiconductor switching device includes at least one of the selective activation and deactivation thereof.

5. The junction box of claim 4 wherein:

the adjustment of the operative cycles of the semiconductor switching devices includes activating at least two of the semiconductor switching devices to provide in parallel electrical power to the same load.

6. The junction box of claim 4 wherein:

the adjustment of the operative cycles of the semiconductor switching devices includes activating at least two of the semiconductor devices to provide redundantly electrical power to the same load.

7. The junction box of claim 2 wherein:

the adjustment of the operative cycle of a semiconductor switching device includes at least one of the selective activation and deactivation thereof.

8. The junction box of claim 7 wherein:

the adjustment of the operative cycles of the semiconductor switching devices includes activating at least two of the semiconductor switching devices to provide in parallel electrical power to the same load.

9. The junction box of claim 7 wherein:

the adjustment of the operative cycles of the semiconductor switching devices includes activating at least two of the semiconductor devices to provide redundantly electrical power to the same load.

10. The junction box of claim 1 wherein:

one of loads includes an electric motor, wherein the adjustment of the operative cycles of the semiconductor switching devices includes limiting and gradually increasing current to be circulated through at least one of the semiconductor switching devices to provide electrical power to the motor such that a smooth start-up thereof is obtained.

11. The junction box of claim 2 further comprising:

temperature detection means associated with the second control means to adjust the operative cycles of the semiconductor switching devices according to the temperature thereof.

12. The junction box of claim 2 further comprising:

an electronic system having a micro-controller which integrates at least part of the first and second control means, the processing means, memory, and a communications interface.

13. The junction box of claim 12 wherein:

the memory stores values relating to the programming of the first control means, wherein the values are introduced to the memory from the communications interface.

14. The junction box of claim 13 wherein:

the electronic system is operable for rewriting the values of the memory with new values in order to adjust the operative cycles of the semiconductor switching devices to new features in terms of the amount and types of load of the same or different vehicle, wherein the new values are introduced to the electronic system from the communications interface.

15. The junction box of claim 13 wherein:

the communications interface is a two-way interface.

16. The junction box of claim 15 wherein:

the communications interface is operable to be connected to a communications network of a vehicle.

17. The junction box of claim 2 wherein:

at least some of the semiconductor switching devices integrate at least part of the second control means.

18. The junction box of claim 2 wherein:

at least some of the semiconductor switching devices are semiconductor power switching devices.

19. The junction box of claim 18 wherein:

each semiconductor power switching device is a field effect transistor.

20. The junction box of claim 12 further comprising:

a casing for housing the semiconductor switching devices, the casing having openings for access to the input, the outputs, and the communications interface.

* * * * *